United States Patent [19]

Miller et al.

[11] Patent Number: 5,842,199

[45] Date of Patent: Nov. 24, 1998

[54] SYSTEM, METHOD AND ARTICLE OF MANUFACTURE FOR USING RECEIVER OPERATING CURVES TO EVALUATE PREDICTIVE UTILITY

[75] Inventors: Bradley N. Miller, Polymouth; John T. Riedl, Falcon Heights; Joseph A. Konstan, St. Paul, all of Minn.

[73] Assignee: Regents of the University of Minnesota, Minneapolis, Minn.

[21] Appl. No.: 733,806

[22] Filed: Oct. 18, 1996

[51] Int. Cl.[6] .................................................. G06F 17/30
[52] U.S. Cl. .................................. 707/2; 707/4; 707/10; 707/5; 707/102; 707/104; 707/200; 707/205; 707/206; 705/27; 705/10; 705/8; 348/1; 395/61
[58] Field of Search ............................. 707/102, 2, 205, 707/206, 10, 104, 4, 5, 200; 364/497; 607/5; 600/515; 705/27, 10, 8; 704/8; 348/1; 395/61

[56] References Cited

U.S. PATENT DOCUMENTS

| | | | |
|---|---|---|---|
| 3,952,184 | 4/1976 | Bassard | 704/1 |
| 4,041,617 | 8/1977 | Hollander | 434/237 |
| 4,205,464 | 6/1980 | Baggott | 434/237 |
| 4,331,973 | 5/1982 | Eskin et al. | 348/13 |
| 4,348,740 | 9/1982 | White | 395/200.83 |
| 4,546,382 | 10/1985 | McKenna et al. | 348/13 |
| 4,566,030 | 1/1986 | Nickerson et al. | 379/92.04 |
| 4,602,279 | 7/1986 | Freeman | 348/10 |
| 4,627,818 | 12/1986 | Von Fellenberg | 434/236 |
| 4,630,108 | 12/1986 | Gomersall | 348/13 |
| 4,646,145 | 2/1987 | Percy et al. | 348/13 |
| 4,647,964 | 3/1987 | Weinblatt | 348/2 |
| 4,658,290 | 4/1987 | McKenna et al. | 348/1 |
| 4,682,956 | 7/1987 | Krane | 434/237 |
| 4,745,549 | 5/1988 | Hashimoto | 705/8 |
| 4,781,596 | 11/1988 | Weinblatt | 434/236 |
| 4,870,579 | 9/1989 | Hey | 705/27 |
| 4,872,113 | 10/1989 | Dinerstein | 705/10 |
| 4,930,077 | 5/1990 | Fan | 704/8 |
| 4,996,642 | 2/1991 | Hey | 705/27 |
| 5,386,104 | 1/1995 | Sime | 235/379 |
| 5,410,344 | 4/1995 | Graves | 348/1 |
| 5,544,281 | 8/1996 | Maruoka et al. | 706/58 |
| 5,704,017 | 12/1997 | Heckerman | 395/61 |
| 5,708,591 | 1/1998 | Givens | 364/497 |
| 5,754,938 | 5/1998 | Herz et al. | 455/4.2 |
| 5,754,939 | 5/1998 | Herz et al. | 455/4.2 |

OTHER PUBLICATIONS

V. Mashayekhi et al., "CAIS: Collaborative Asynchronous Inspection of Software," Department of Computer Science, University of Minnesota, Oct. 25, 1994.

P. Resnick et al., "GroupLens: An Open Architecture for Collaborative Filtering of Netnews," Department of Computer Science, University of Minnesota and MIT Center for Coordination Science, Jan. 19, 1995.

D. Goldberg et al., "Using Collaborative Filtering to Weave an Information Tapestry," *Communications of the ACM*, vol. 35, No. 12, Dec. 1992.

U. Shardanand et al., "Social Information Filtering: Algorithms for Automating 'Word of Mouth'," *CHI '95 Mosaic of Creativity*, May 7–11, 1995.

(List continued on next page.)

*Primary Examiner*—Thomas G. Black
*Assistant Examiner*—Srirama Channavajjala
*Attorney, Agent, or Firm*—Merchant, Gould, Smith, Edell, Welter & Schmidt, P.A.

[57] ABSTRACT

An electronic information system is provided for determining predictive utility of prediction techniques in ascertaining which items are valued. The information system includes an input mechanism for obtaining a set of measurements of actual value of items presented to a user. The items presented to the user are derived from a plurality of items by utilizing predictions from a prediction technique. A processor is operatively coupled to the input mechanism to generate a quality metric receiver operating curve (ROC) from the set of measurements which corresponds to a measure of effectiveness of the prediction technique in predicting which items are valued by the user. In addition, a method is provided for operating this electronic information system. Also, a storage device readable by a computer system for implementing this method is provided.

24 Claims, 8 Drawing Sheets

OTHER PUBLICATIONS

M. Morita et al., "Information Filtering Based on User Behavior Analysis and Best Match Text Retrieval," School of Information Science, Japan Advanced Institute of Science and Technology. no. date.

G. Salton, "The State of Retrieval System Evaluation," vol. 28, No. 4, (1992) pp. 441–449.

T. Saracevic, Ph D., "Evaluation in Information Retrieval," School of Communication, Information and Library Studies, Rutgers University, pp. 138–146. No date.

T. B. Roby, "Belief States: A Preliminary Empirical Study," *Technical Documentary Report No. ESD–TDR–64–238*, Mar. 1964.

References, *Publications of the U.S. Army Personnel Research Office, OCRD, DA*, p. 5, No date.

C. S. Gersoni et al., Technical Research Note 143, "Values Associated with Military Caseer Motivation".

L. V. Gordon et al., Technical Research Note 143, "Values Associated with Military Caseer Motivation". Mar. 1964.

L. J. Stricker, "Difficulty and Other Correlates of Criticalness Response Style at the Item Level," Educational Testing Service, May 1961.

Belkin, N. et al., "Information filtering and information retrieval: Two sides of the same coin?" *Communications of the ACM*, 35(12), 16 pgs. (Dec. 1992).

Foltz, P. et al., "Personalized information delivery: an analysis of information filtering methods," *Communications of the ACM*, 35(12), 15 pgs. (Dec. 1992).

Loeb, S., "Architecting personalized delivery of multimedia information," *Communications of the ACM*, 35(12), 15 pgs. (Dec. 1992).

Researching a Legal Citation

|  | Predict Good | Predict Bad |
|---|---|---|
| Desirable | HIT<br>+ HIGH | MISS<br>- VERY HIGH |
| Undesirable | False Positive<br>- MEDIUM | Correct Rejection<br>+ LOW/MED |

Selecting a Restaurant

|  | Predict Good | Predict Bad |
|---|---|---|
| Desirable | HIT<br>+ MED | MISS<br>- MED |
| Undesirable | False Positive<br>- HIGH | Correct Rejection<br>+ HIGH |

Watching a Movie

|  | Predict Good | Predict Bad |
|---|---|---|
| Desirable | HIT<br>+ HIGH | MISS<br>- LOW |
| Undesirable | False Positive<br>- $7 + 30 minutes | Correct Rejection<br>+ MED/HIGH |

Selecting a General Science Article

|  | Predict Good | Predict Bad |
|---|---|---|
| Desirable | HIT<br>+ HIGH | MISS<br>- LOW |
| Undesirable | False Positive<br>- 5 minutes | Correct Rejection<br>+ MED/HIGH |

FIG. 2 - PRIOR ART -

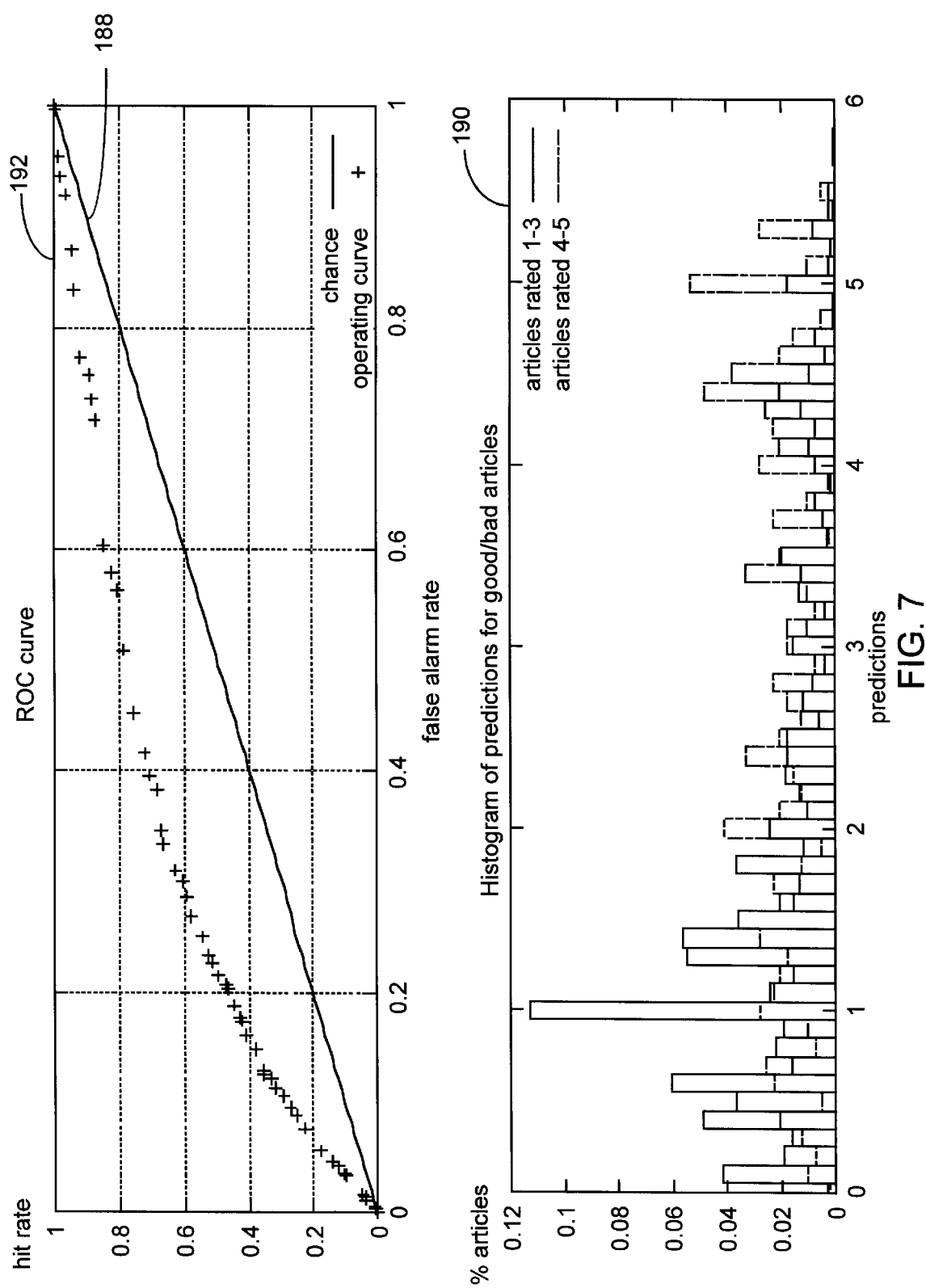

SYSTEM, METHOD AND ARTICLE OF MANUFACTURE FOR USING RECEIVER OPERATING CURVES TO EVALUATE PREDICTIVE UTILITY

FIELD OF THE INVENTION

The present invention relates generally to systems that use various prediction techniques. More specifically, the present invention is directed to the use of receiver operating curves (ROCs) in determining an empirical measure of predictive utility.

BACKGROUND OF THE INVENTION

Centuries ago the critical information problems were how to record information and how to distribute information. Today, the computer has nearly completely solved these problems. Most information is now recorded directly on computer media and as a result thousands of pages of information are moved around the world in seconds via electronic data networks. In the process of solving information dissemination problems, however, people have overwhelmed themselves with the sheer volume of available information. The critical question is how to benefit from the richness of the available information without getting bogged down by the overwhelming volume.

One possibility is to make use of the opinions each person forms when perusing any piece of information. Taken together, the web of all of these opinions is a rich resource that could be used to sift through the available information for nuggets of value. This technique is already applied informally, through word-of-mouth in the physical world, and through forwarded mail, news, and uniform resource locators (URLs) in the virtual world. However, these informal processes are not powerful enough to deal with the millions of new documents being created every week. Computers helped create this problem; perhaps they can help solve it. A need exists for a solution that gathers this collective wisdom more formally, and applies it to the problem of selecting which of the available documents will be valuable to each person, individually.

These principles have been applied in one area of research, known as collaborative filtering. Collaborative filtering seeks to understand the relationships between people, and to use those relationships to help people meet information their needs more effectively. Ratings are entered by the user to indicate his or her opinion of the document to the collaborative filtering system. Based on previously entered ratings by other users, predictions are made for a user of the value of an item to that user. Ratings often represent the user's evaluation of the document along one or more dimensions. There are many possible dimensions, including overall enjoyment, value to the task at hand, interest in the topic, reputation of the author, appropriateness for the context, quality of writing, and amount of new material versus repeated material. Ratings along each of these dimensions can be either explicit, requiring special user interaction, or implicit, captured from ordinary user actions.

The most common explicit rating methods in collaborative filtering systems are single keystrokes entered by users. The keystrokes usually represent values along a single ordered dimension, discretized for ease-of-entry. Ratings can also be entered through graphical sliders, which are similar, except that they often support more possible values. Another common rating method is textual ratings. Textual ratings are either keyword or free-form. Keyword textual ratings often focus on characterizing the topic. Keyword textual ratings that focus on measuring the quality are very similar to keystroke ratings. Free-form textual ratings can be valuable for users, but are difficult to process automatically. Free-form textual ratings are more common in domains in which the total number of documents is relatively low, so users can peruse a substantial fraction of them.

Implicit ratings are collected by non-intrusively watching the user read a document. Observations about what the user does with the document may lead to insights into the value of the document to the user. For instance, if a user reads the title or abstract of a document, but chooses not to read the document, that may indicate low interest in the topic of the document. On the other hand, if the user chooses to save a document to a file, or to forward it to a colleague, that may indicate higher interest in the document. The time that a user spends reading a document (time spent reading) is another implicit rating. Intuitively, users are likely to spend longer with documents they find valuable than with documents they find uninteresting.

Collaborative filtering systems have largely focused on explicit ratings. In small tightly focused groups with substantial shared interests, textual ratings have proven valuable. However, in larger groups with more diverse interests, a more structured ratings system with automatic computation of personalized predictions would be beneficial.

In a system using explicit ratings, the user responds to each item with a keystroke or other indication of preference. The system uses the user's response to influence its prediction algorithms for this user in the future. Users can informally combine their ratings along any of the possible ratings dimensions to create this single rating. Existing prediction algorithms do a good job of making predictions for users based on explicit ratings along this single dimension.

However, there are many known prediction algorithms. A need exists for a way to measure whether one prediction algorithm is better than another for a given set of circumstances. An area of scientific study which is focused on this problem is known as predictive utility. Predictive utility refers generally to the value of having predictions for an item before deciding whether to invest time or money in consuming that item. The concept is general enough to include physical items such as books or videotapes as well as information items, such as news articles or World Wide Web pages. A domain with high predictive utility is one where users will adjust their decisions a great deal based on predictions. A domain with low predictive utility is one where predictions will have little effect on user decisions.

Predictive utility is a function of the relative quantity of desirable and undesirable items and the quality of predictions. The desirability of an item is a measure of a particular user's personal value for that item. Items are not intrinsically good or bad; an item is good for a user if that user finds it desirable and good in general if a large majority of users finds it desirable.

The cost-benefit analysis for a consumption decision compares the value of consuming a desirable item (a hit), the cost of missing a desirable item (a miss), the value of skipping over an undesirable item (a correct rejection), and the cost of consuming an undesirable item (a false positive). FIG. 2 shows four cost-benefit analyses. For watching a movie, the value of finding desirable movies is high to movie fans, but the cost of missing some good ones is low since there are many desirable movies for most movie fans. The cost of false positives is the price of the ticket plus the amount of time before the watcher decides to leave for each one, and the value of correct rejections is high because there are so many undesirable movies that without rejecting many of them it would be impractical to see movies at all. Similarly, finding desirable general-interest scientific articles benefits from predictions since there are so many to select from (even though many are good thanks to peer review and editors). Restaurant selection follows a similar pattern, though the risk of going to an undesirable restaurant is higher since you typically still have the meal and the bill. Legal research is very different. The cost of missing a relevant and important precedent is very high, and may outweigh the cost of sifting through all of the potentially relevant cases (especially when that cost is being billed to the client and serves as protection against malpractice).

The costs of misses and false positives represent the risk involved in making a prediction. The values of hits and correct rejection represent the potential benefit of making predictions. Predictive utility is the difference between the potential benefit and the risk. Thus, the risk of mistakes is lowest for movies or scientific articles, and the potential benefit is highest for movies, articles, and restaurants.

One important component of the cost-benefit analysis is the total number of desirable and undesirable items. If 90% of the items being considered are desirable, filtering will generally not add much value because there are few correct rejections and the probability of a hit is high even without a prediction. Of course, in a case such as scientific articles, users may refine their desires to select only the most interesting of the interesting ones given their limited time. On the other hand, if there are many items and only 1% are good, then filtering can add significant value because the aggregate value of correct rejections becomes high.

The present invention utilizes the principles of predictive utility to provide a solution to the problem of measuring whether one prediction algorithm is better than another for a given set of circumstances as well as other problems, and offers other advantages over the prior art.

SUMMARY OF THE INVENTION

The present invention relates to an electronic information system for determining predictive utility of prediction techniques in ascertaining which items are valued.

In accordance with one embodiment of the invention, the information system includes an input mechanism for obtaining a set of measurements of actual value of items presented to a user. The items presented to the user are derived from a plurality of items by utilizing predictions from a prediction technique. A processor is operatively coupled to the input mechanism to generate a quality metric receiver operating curve (ROC) from the set of measurements which corresponds to a measure of effectiveness of the prediction technique in predicting which items are valued by the user.

In addition, a method is provided for operating this electronic information system. Also, a storage device readable by a computer system for implementing this method is provided.

These and various other features as well as advantages which characterize the present invention will be apparent upon reading of the following detailed description and review of the associated drawings.

BRIEF DESCRIPTION OF THE DRAWINGS

FIG. 2 shows a prior art diagram of predictive utility cost/benefit analyses for four tasks.

FIG. 7 shows a graph containing a histogram of signal and noise distributions of predictions for articles and an ROC mapped from the histogram.

DETAILED DESCRIPTION

Figure 1:
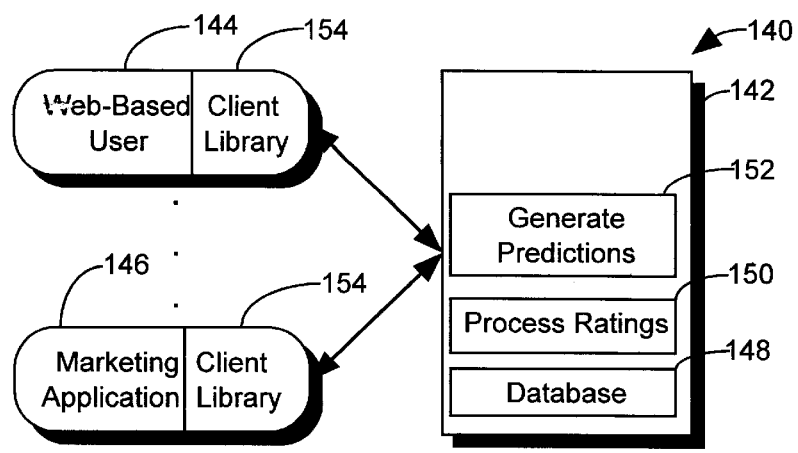
FIG. 1 is a block diagram of a high level overview of a preferred embodiment information system client-server architecture in accordance with the present invention.

The information system 140 preferably uses a client-server architecture FIG. 1. Collaborative filtering applications, such as those which can be developed with this system, communicate ratings and predictions with the information system server 142. The server 142 receives ratings and other data from the clients 144, 146, stores them in its databases 148, analyzes them 150, and sends predictions and other data 152 back to the clients 144, 146.

Collaborative filtering applications access the information system server 142 through the client library 154. The client library 154 handles the details of connecting to the server 142 through an open network protocol. This protocol preferably is Transmission Control Protocol/Internet Protocol (TCP/IP)-based. The application program 144, 146 is linked with the client library 154. Simple application-program interface (API) calls are used to send ratings to the server 142 and receive predictions from the server 142. Both the send and receive operations are transparently buffered in the client library 154 to achieve high performance while maintaining a simple interface for client programs 144, 146.

The prediction information system 142 is the generic name for the set of processes that provide information system services to client programs 144, 146.

Figure 3:
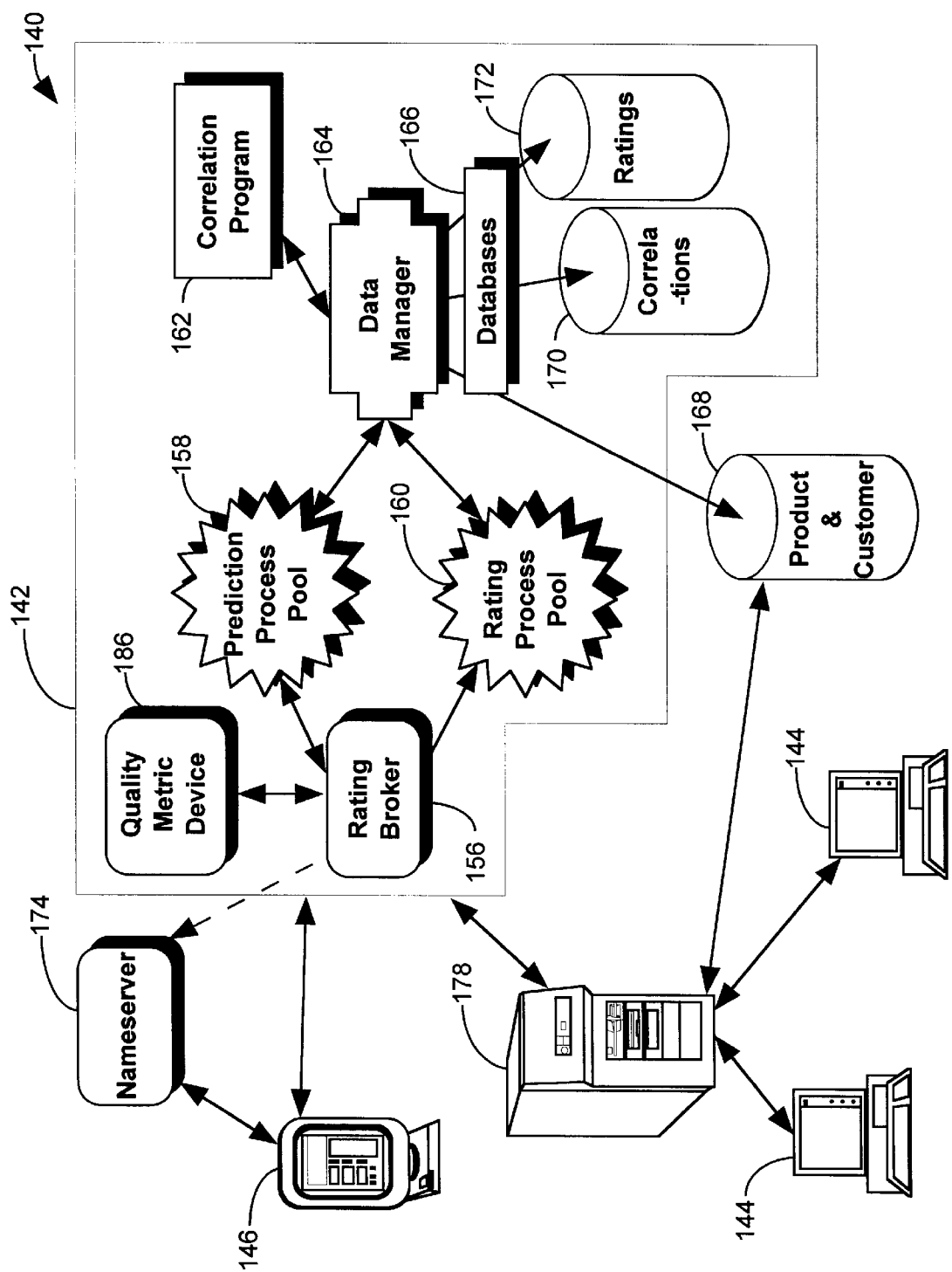
FIG. 3 is a block diagram of a middle level overview of the preferred embodiment information system client-server architecture shown in FIG. 1.

As shown in FIG. 3, the prediction information system 142 preferably includes a rating broker 156, a quality metric device 186, prediction processes 158, rating processes 160, a correlation program 162, and a data manager 164. Various types of prediction, rating, and, correlation programs, or different database back-ends can be used without departing from the scope and spirit of the present invention. The information system rating broker 156 is the part of the server 142 that routes client requests to the appropriate prediction 158 or rating 160 process. Client applications 144, 146 connect to the information system 140 rating broker 156 through the client library 154. Applications are insulated from implementation changes to the server 142 by the consistent API interface. The quality metric device 186 compares predictions to ratings of vaule to the user to produce quality metric ROCs.

Figure 4:
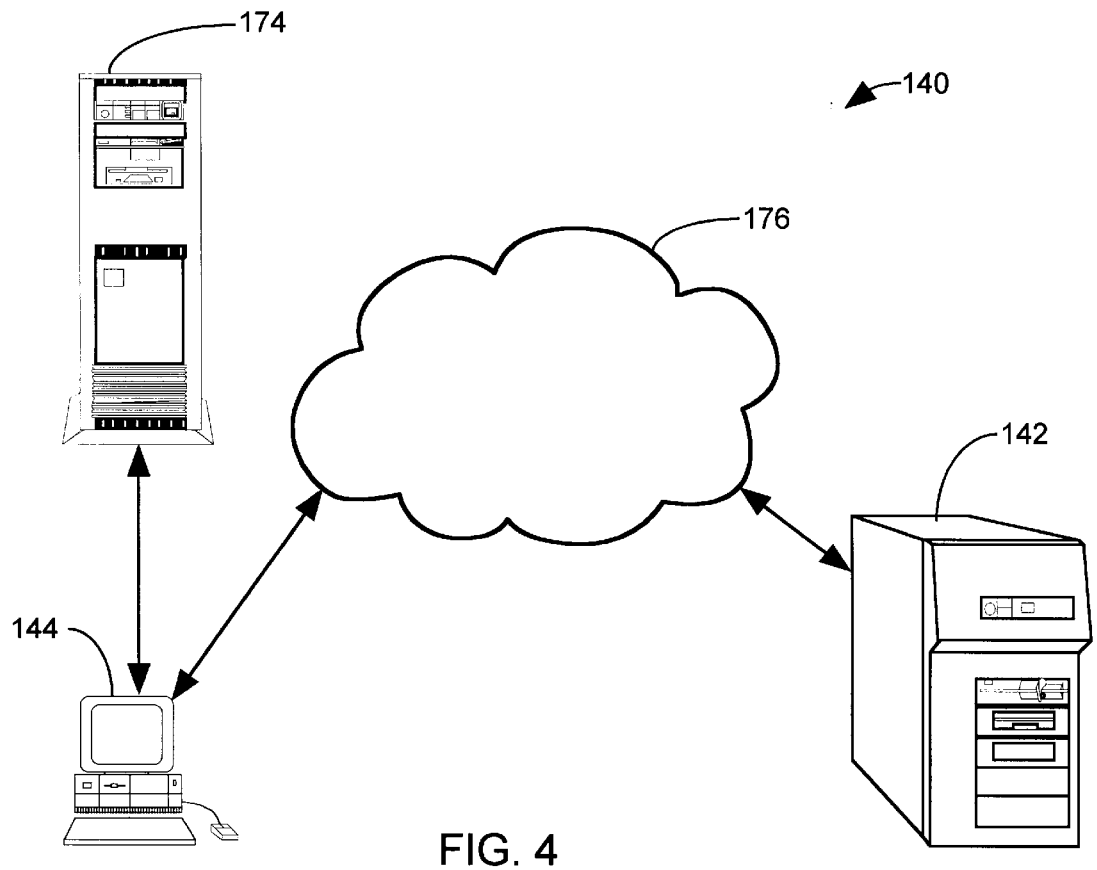
FIG. 4 is a block diagram of a particular arrangement of devices operating as the information system shown in FIG. 1.

FIG. 4 shows one possible approach to building a information system 140 in a collaborative filtering environment. In this environment, client programs executed on computers 144 display items and predictions to users utilizing the clients and send explicit ratings and implicit measures to servers 142 via an interactive network 176. The collaborative filtering servers 142 receive ratings and implicit measures from the clients 144 via the interactive network 176. Also, clients 144 receive items from separate servers 174. The interactive communication network 176 can take many forms. For example, the network 176 may be a data bus, a public switched telephone network (PSTN), a public data network, a private data network, a wireless data service or any combination thereof.

Figure 5:
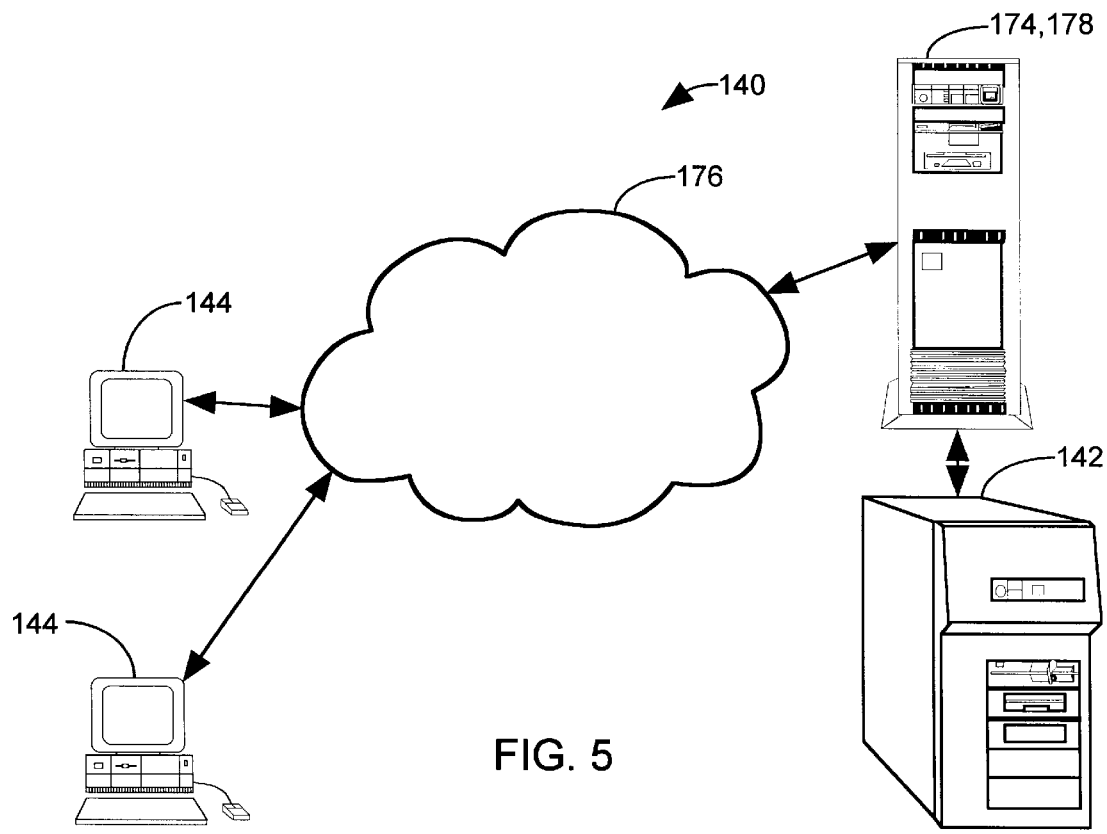
FIG. 5 is a block diagram of an alternative arrangement of devices operating as the prediction information system shown in FIG. 1.

An alternative architecture for collaborative filtering is shown in FIG. 5. Client computers 144 receive partially or completely formatted displays from servers 174, with predictions merged with items. Item servers 174, such as World-Wide Web (WWW) servers 178 directly communicate with collaborative filtering servers 142 to send explicit ratings and implicit measures from clients 144, and to receive predictions.

It will be appreciated by those skilled in the art that the principles described herein could readily be applied to other types of environments besides collaborative filtering without departing from the scope and spirit of the present invention. For example, data mining systems and information retrieval systems may benefit from the teachings of the present invention.

Figure 6:
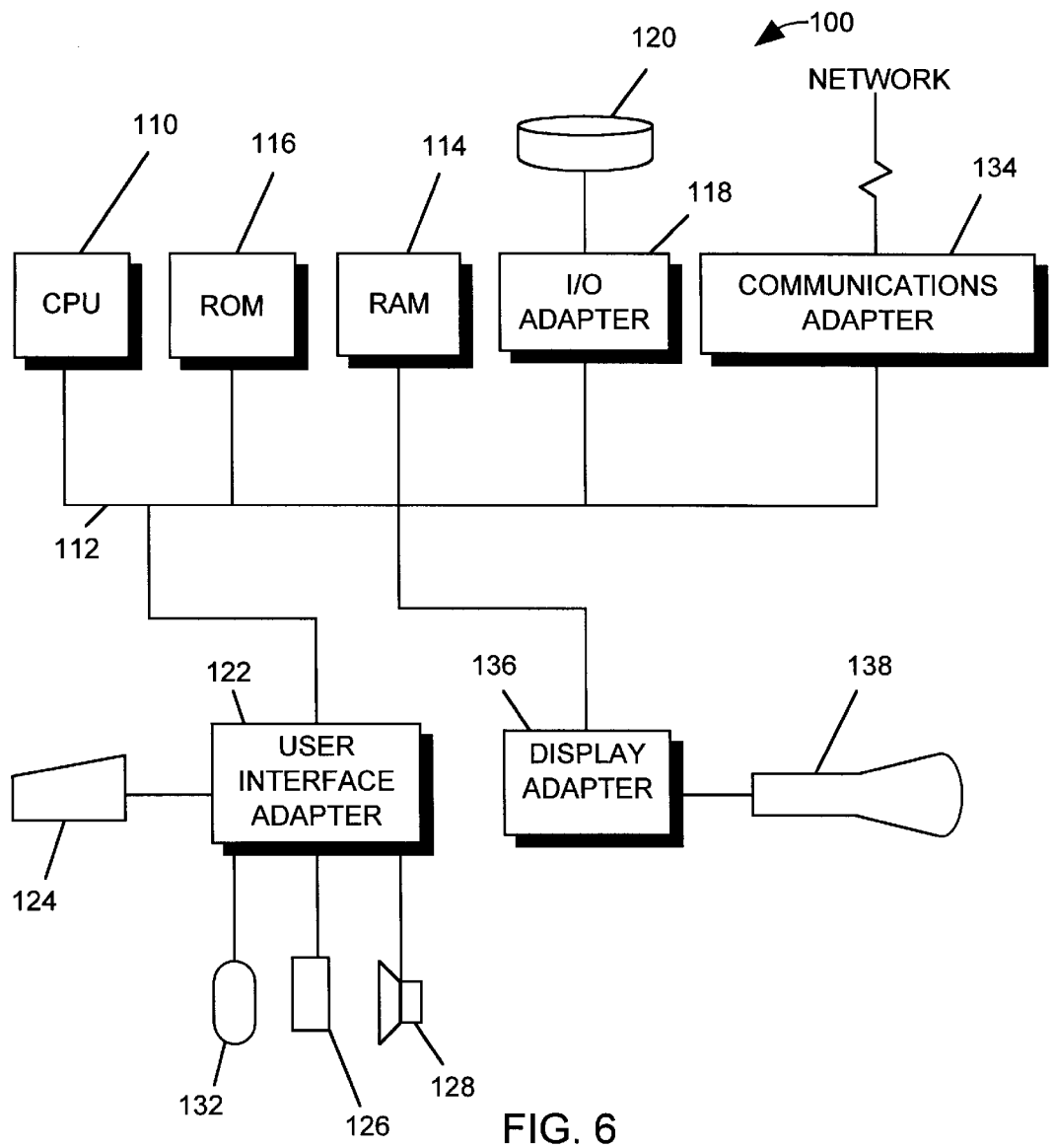
FIG. 6 is a block diagram of a representative hardware implementation which could perform functions of the information system shown in FIG. 1.

Referring now to FIG. 6, the preferred embodiment of the present invention is preferably practiced in the context of an operating system resident on one or more workstations or personal computers such as the Sun Microsystems® Sparc Station®, IBM® PS/2 or Apple® Macintosh® computer. The information system clients and or servers may each operate on one or more of these workstations. A representative hardware environment 100 is depicted in FIG. 6, which illustrates a typical hardware configuration of a workstation in accordance with the preferred embodiment having a central processing unit 110, such as a microprocessor, and a number of other units interconnected via a system bus 112. The workstation shown in FIG. 6 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., an interactive network) and a display adapter 136 for connecting the bus 112 to a display device 138. The workstation typically has resident thereon an operating system such as UNIX®, the Microsoft® Windows or Windows NT operating system, the IBM OS/2® operating system or the Apple MacOS® operating system.

Referring now to FIGS. 3 and 6 together, the electronic information system 140 includes a prediction information system 142 which operates in a hardware apparatus 100. This prediction information system 142 has an input mechanism (e.g., i/o adapter 118, communication adapter 134, or user interface adapter 122) for obtaining a set of measurements of actual value of items presented to a user. The items presented to the user preferably are derived from a group of items by utilizing predictions from a prediction technique. A processor 110 is operatively coupled to the input mechanism and an output device (e.g., i/o adapter 118, communication adapter 134, display adapter 136, or user interface adapter 122) to cooperatively perform several functions. These functions include generating a quality metric receiver operating curve (ROC) from the set of measurements which corresponds to a measure of effectiveness of the prediction technique in predicting which items are valued by the user. The processor 110 provides the output device various data needed by other computing functions (e.g., quality metric ROC).

In one embodiment, the prediction information system 142 input mechanism is capable of obtaining a first and a second set of measurements of actual value of a first and a second set of items presented to the user, respectively. Each set of items presented to the user preferably is derived from the group of items by utilizing predictions from different prediction techniques. The prediction information system 142 processor 110 also is capable of generating a first and a second quality metric ROC from the first and the second set of measurements, respectively. In such an embodiment, the processor 110 also compares the first and the second quality metric ROC to compare effectiveness of each different prediction technique to each other in predicting items valued by the user. This comparison may be subsequently used to select one of the different prediction techniques for another process.

The different prediction techniques may differ in many ways. For example, the prediction techniques may each utilize different underlying prediction algorithm (e.g., Pearson-based, average, weighted average). This comparison of the first and the second quality metric ROC can be used to select which underlying prediction algorithm to use in the future. Alternatively, the different prediction techniques may utilize a single underlying prediction algorithm with different operating parameters such that the comparison of the first and the second quality metric ROC selects which operating parameters are subsequently used with the prediction algorithm. These operating parameters, for example, consist of partitioning schemes for the plurality of items by type of items, categories within the same type of item, or other ways in which a set of items may be subdivided.

In accordance with another embodiment of the present invention, the information system 140 includes a prediction information system 142 as well as a client device 144 operatively coupled to the quality metric device 156 through an interactive network. The client device 144, like the prediction information system 142, operates in a hardware apparatus 100. The client device 144 includes a user interface (e.g., i/o adapter 118, communication adapter 134, display adapter 136, or user interface adapter 122) which presents the items and other information to the user. In addition, the client device includes a user input device (e.g., i/o adapter 118, communication adapter 134, or user interface adapter 122) which receives data input by the user from which a set of measurements of actual value of items presented to a user is obtained. A client processor 110 is operatively coupled to the user interface and user input device to cooperatively perform several functions. These client processor-based functions include: receiving items to present to the user from an output mechanism of the prediction information system 142, obtaining the set of measurements of actual value of items based on the data input by the user, and providing the set of measurements of actual value of items to the input mechanism of the prediction information system 142.

In accordance with another embodiment, the information system 140 may have a client processor 144 and a prediction information system 142 located within a single apparatus 100. In this embodiment, the system 140 may be set up as a kiosk in a store that customers query for a recommendation on a movie, book, music, or other choices.

In accordance with another embodiment as shown in FIGS. 4 and 5, the client processor 144 communicates with the prediction information system 142 through an interactive network 176 such that they are remotely located from one another. In such an arrangement, the user interface, input mechanism, and processor together form a client computing device which is operatively coupled through the interactive network 176 to a server 142 which executes a process that performs functions of the prediction information system 142. In some instances it may be beneficial to split the processing tasks between a first processor and a second processor which together perform the operations of the client processor 144. If this splitting of processing of tasks is done, then the user interface, input mechanism, and first processor together may form a client computing device which is operatively coupled through the interactive network 176 to a server 142 which houses the second processor and which executes a process that performs functions of the prediction information system 142.

One application for the information system 140 is reading Usenet news. A typical news-reading session for a information system 140 enhanced newsgroup works as follows. The user starts up a news-reader on a computing device 144, which creates a connection to both the news server 174 and the other server 142 which operates as a rating broker as well as the quality metric device 156. The newsreader authenticates itself to the rating broker 156 by using a pseudonym chosen, and registered with the rating broker 156 through, for example, a World Wide Web site. The rating broker 156 makes no association between a user's pseudonym, and his real identity.

The user selects a newsgroup to read, and "enters" the newsgroup. The newsreader contacts the news server 174 and obtains header information for items the user has not read yet. The newsreader contacts the rating broker 156 and requests predictions for the unread items. The rating broker 156 calculates personalized predictions for the user and returns the predictions to the newsreader. Newsreaders such as the UNIX®-based GNUS, tin, or xrn could be used. Once the user has the predictions he can pick and choose which items he wants to read based on the subject lines and the predictive scores supplied for each item. When the user selects an item to read the newsreaders sets a timer to keep track of how much time the user spends reading the article as an implicit measure. After the user has read some or all of the article he gives the article a rating on a scale from 1 to 5. To make rating articles as easy as possible, the interface is designed so that a rating can be entered with a single extra keystroke. Users can rate articles in answer to questions like the following sample question: "Would I like to see more articles like this one?" In answer to this question, a 1 indicates a strong no and a 5 indicates a strong yes.

Once the user has read and rated the articles he is interested in he "leaves" the newsgroup. When a user leaves a newsgroup the newsreader sends all the ratings and times collected for the read articles to the rating broker 156. The prediction information system 142 stores the ratings, time measurements, and predictions in a database for analysis.

USING RECEIVER OPERATING CURVES TO EVALUATE COLLABORATIVE FILTERING PREDICTION SYSTEMS

Using stored ratings and time values one can create conditions to compare collaborative filtering systems with one another, and with other prediction systems. These comparisons can be used to evaluate the predictive utility of a collaborative filtering system, and also as a means of determining the best version of a collaborative filtering system to use for a given application.

MEASUREMENTS OF VALUE TO USERS

Collaborative filtering systems deliver value to users by helping them select among available items those they will find most valuable. Evaluating collaborative filtering systems requires an external measure of the value of each item to the user, to determine how effective the system is in helping the user make selections. There are many possible external measures. Useful measures include:

Explicit ratings. The user can enter a keystroke indicating how valuable he finds the item.

Implicit measures. The system can measure how the user uses the item as a measure of its value to him. For instance, items the user spends a long time perusing can be assumed to have greater value to him. Actions the user takes with the item can also indicate its value.

Existing prediction systems. Previously existing prediction system that generate predictions that are known to be of value to the user can be used as estimates of the value of the item. For instance, ratings from a critic whose taste is known to agree with the user can be used. In this case the ratings from the critic become the "gold standard" against which other predictions are measured. ROCs may be useful in these cases if the "gold standard" prediction is expensive or difficult to obtain compared to the alternative prediction system.

Average ratings. The average rating of all of the users of a collaborative filtering system is a measure of the average value of the item to the set of users. If the items in a domain have intrinsic value to the set of users, the average rating is a useful indication of probable value to individual users.

The external measure is converted into a rating of the value of the item to the user. In the text below, rating refers to this converted external measure. Once the predictions and measurements of value are gathered, an evaluation can be made of the effectiveness of the prediction system.

RECEIVER OPERATING CURVES

Several ways to evaluate collaborative filtering systems exist. Some of the existing metrics include mean absolute error, mean squared error and the linear correlation between ratings and predictions.

The mean absolute error is computed by taking the absolute value of the difference between the actual rating entered by the user and the prediction computed by the algorithm for each rating/prediction pair, and computing the mean of all of the differences. The lower the mean absolute error, the better the algorithm.

The mean absolute error captures only the magnitude, and not the distribution of the error. The standard deviation of the error is a measure of the algorithm's level of consistent accuracy.

The combination of the mean absolute error and the standard deviation gives information on both the amount and the distribution of the error, but does not sufficiently penalize algorithms that make large errors. Large errors are more important than small errors because users are more likely to make selection mistakes because of large prediction errors. The mean squared error, similar to least squares regression, disproportionately penalizes algorithms that make large errors more than those that make small errors.

In the presence of uncertainty, the mean squared error tends to reward algorithms that produce predictions near the mean, since these algorithms have less range for potential error. In practice, algorithms that predict near the mean are less valuable for users, since most items have similar predictions.

All of the known metrics for evaluating collaborative filtering systems have drawbacks that make it difficult to interpret their results in terms that make sense to users. After all, users are not interested in the possible error in the predictions. Users are interested in how they can use the predictions to make good decisions.

In a sense, the metrics are solving the wrong problem by asking how far away the predictions are from where they should be. What they should be asking is how effective the collaborative filtering system is for helping users make decisions. Effectiveness is based on two questions:

What threshold will the user choose for making decisions?

How often will combination of threshold and prediction lead to the right decision?

The answer to the first question will vary from user to user and from session to session, and the answer to the second question depends critically on the first question. What is needed is a metric for evaluating collaborative filtering systems that provides an answer to the second question for each possible answer to the first question. Users could use such a metric to select suitable thresholds, and for each threshold the metric would indicate how often the prediction would lead the user to the right decision.

The sensitivity measurement from signal detection theory is a metric for comparing collaborative filtering prediction algorithms that has these properties. This measurement is based on developing a Receiver Operating Curve (ROC) for the prediction system that directly identifies how effective the system is at rejecting the items the user will perceive as having little value, and at recommending the items the user will see as having substantial value. This metric has the advantage over previously proposed collaborative filtering metrics that it directly represents the effectiveness of the metric in terms of how the predictions work for users.

In a collaborative filtering system, the prediction process which uses these ROCs as a metric has three phases: determine neighborhood, determine individual correlation, and compute personalized prediction.

In the neighborhood phase, the set of possible neighbors is searched for neighbors who might have similar interests to the current neighbor. Similar interests can be determined in many different ways.

In the individual correlation phase, the prediction system computes between the first user and each user in his neighborhood who has rated the item in question a metric that evaluates the similarity between these users. In the preferred embodiment, the metric is also based on the co-occurrence matrix. It will be appreciated by those skilled in the art that many possible other metrics may be used for this function without departing from the scope and spirit of the present invention.

In the personalized prediction phase, the individual correlations from the neighborhood are combined with the ratings of the neighborhood to produce a personalized prediction for the user for this item.

CONSTRUCTING A RECEIVER OPERATING CURVE FOR A COLLABORATIVE FILTERING SYSTEM

An ROC for a collaborative filtering system is generated based on a set of predictions from the collaborative filtering system and a set of external ratings of the actual value of the items to the users:

1) A list of (prediction, rating) pairs is generated for a group of items.
2) A threshold is selected that divides the externally generated ratings into signal and noise categories. The signal is the items the user would find valuable, while the noise is the items the user would not find valuable.
3) Each pair is classified as either signal or noise, by comparing the rating to the threshold.
4) The signal and noise curves are now generated by putting the predictions into intervals, and calculating the proportion of predictions that fall within each interval.
5) The ROC is then constructed by moving the operating point from zero to five in small increments. For each operating point, an (x, y) pair is computed. The x value is the area under the noise curve to the left of the operating point. The y value is the area under the signal curve to the right of the operating point. The (x, y) pairs are plotted on a graph to create the ROC.

FIG. 7 shows the signal and noise curves (displayed as histograms 190) along with the resulting ROC 192 for a sample dataset. In the FIG. 7 the straight line 188 from 0,0 to 1,1 is the chance line. The chance line represents how sensitive an algorithm would be if it just produced random ratings. The ROC reveals much about the characteristics of the underlying prediction algorithms. At any point on the curve, the y value identifies the percentage of the valuable items that the prediction system recommends as valuable. This is called the hit rate. The x value identifies the percentage of the items a user did not find valuable that the prediction system recommends to him/her. This is called the false alarm rate.

Figure 8:
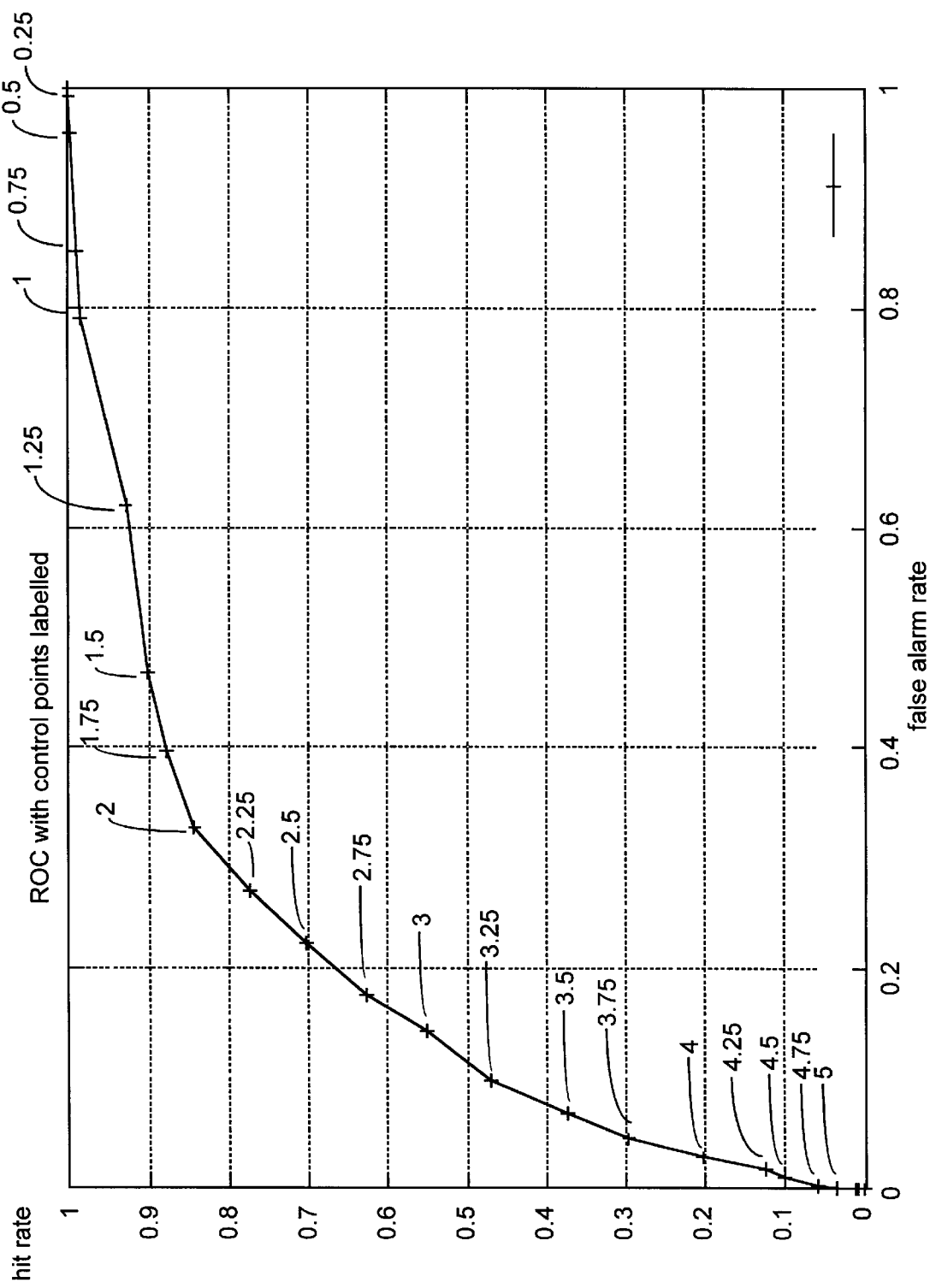
FIG. 8 shows a graph of an ROC for predictions from an information system using explicit ratings to characterize signal and noise.

The discrete points along the curve at which (x, y) pairs were computed are known as operating points. Each operating point represents a decision by a user about how to use the prediction system. The user selects an operating point by choosing which predictions returned by the prediction system will cause him to ignore the corresponding item, and which predictions returned by the prediction system will cause him to consume the resulting item. The ROC shows the user at each operating point how many hits or false alarms the user would get if he read every article with a prediction greater than the selected prediction value. For example in FIG. 8 if all articles with a prediction greater than 2.25 are read, then a user will get a hit rate of 80% and a false alarm rate of 30%.

The number of distinct operating points along the curve is an indication of how flexible the algorithm is. If there are only a few operating points that means that the algorithm is not producing a wide range of predictions, and hence the user will have few choices for operating points.

DATASETS FOR EVALUATION

Sets of pairs of predictions and external ratings are needed to use ROCs to evaluate prediction systems. For an actively running system, the dataset can be generated by collecting the data as the system runs.

In some cases it is valuable to create the ROC before using the prediction system with real users. In these cases, a historical dataset of a set of items and external evaluations can be used. Predictions can be generated for the items from the historical dataset using the prediction algorithm under study. Then an ROC can be created using the external evaluations and the new predictions. This ROC can be used to evaluate how effective the new prediction algorithm would have been with the historical data, which is in many cases a good estimate of how effective the new prediction algorithm will do in the future.

Prediction systems can also be evaluated using synthetic data. A stochastic model of user behavior can be created, and data generated by simulating user behavior on a set of real or synthetic items. External evaluations can be created from the stochastic model, and used to generate an ROC of the predictions from the prediction system. Creating ROCs with synthetic data makes it possible to evaluate the effectiveness of a prediction system based on predictions of the behavior of actual users.

EVALUATING PREDICTIVE UTILITY WITH RECEIVER OPERATING CURVES

Once an ROC is developed for a collaborative filtering system, it can be used to compare that system with other prediction systems. In particular, ROCs can be used to compare two collaborative filtering systems, or to compare a collaborative filtering system with another prediction system of a different type. In some applications these prediction systems are combined. For instance, collaborative filtering systems can be used to select from among the results of an information retrieval (IR) query those items that will be of greatest value to users. ROCs can be used with combined systems to evaluate the effectiveness of each component individually, as well as the effectiveness of the overall system.

Figure 9:
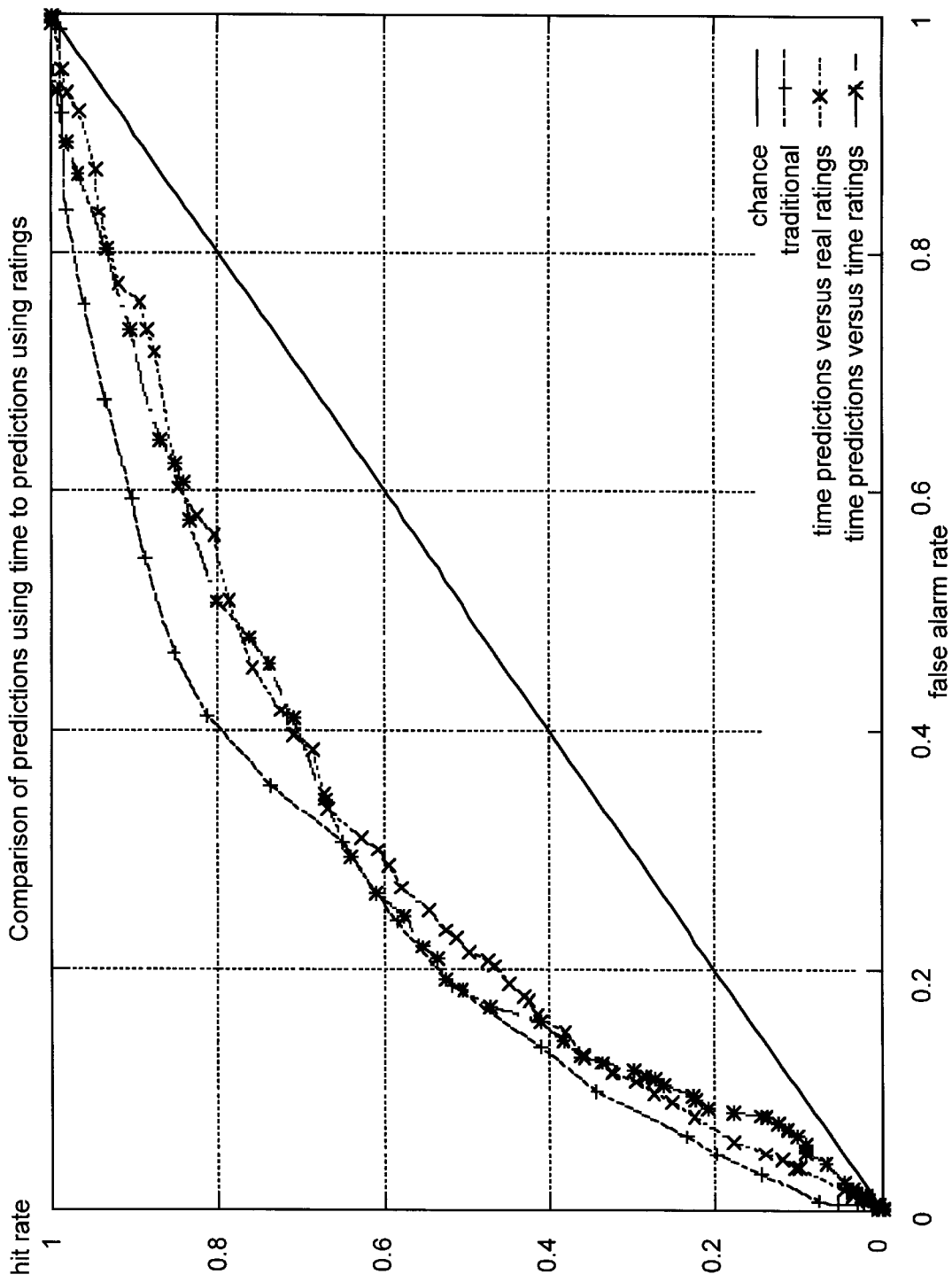
FIG. 9 shows a graph of three ROCs used to compare three prediction systems.

Referring now to FIG. 9, the first indicator from the ROC of the value of the collaborative filtering system is the shape of the curve. The diagonal line through the middle of the graph is the ROC that would be generated for a random prediction algorithm. The further the ROC moves to the upper left from the random line, the more predictive value the ROC provides. A completely vertical ROC would indicate 100% predictive utility. Such a curve would be produced by a collaborative filtering algorithm that always correctly identified the items in which a user is interested. In comparing two ROCs, if one is completely above the other across the entire graph, the upper curve dominates the lower curve. In that case, the algorithm for which the upper curve was created would be better for users for all possible thresholds.

Each ROC has distinct operating points marked on it. The operating points are the discrete threshold values for which the curve was empirically constructed (see for example FIG. 8). Any number of threshold values can be used in computing the curve. However, depending on the steepness of the curve, many of the operating points may overlap, leaving large gaps between other operating points. The gaps indicate regions where it is difficult to find threshold values that produce desired prediction behavior. Among two similar curves, the one with more separate operating points should be preferred, since it gives users more choice among useful threshold values.

In some cases the ROCs for two prediction methods may intersect, with one curve on top in one region, and the other on top in other regions. In this case, the two prediction methods are not definitively related by the metric. The preferred algorithm will depend on which region contains the operating points that are most useful to the users. In practice, the choice of algorithm in these cases depends on the needs of the application.

ADAPTIVE ALGORITHMS

ROCs can be used to select the best prediction system to run for a given application, or to tune an algorithm to perform optimally for an application. The combination of the prediction system and the tuning parameters is hereinafter referred to as the algorithm choice. There are many possible algorithm choices in collaborative filtering systems, including:

Which correlation algorithm to run.

Which prediction algorithm to run.

How ratings should be aged.

How to partition the item database.

Each of these algorithm choices can be made globally for the entire application, or specifically for individual users, individual types of items, or even individual items.

Database partitioning is one example of an adaptive algorithm. Collaborative filtering often works differently in different domains. For instance, a user's taste in restaurants may be a poor predictor of his taste in music. In applications that span multiple domains, the database can be partitioned to separate items according to domain. Correlation and prediction algorithms can be run separately in each domain to avoid cross-over that might weaken the predictive utility of the system. Choosing the domains can be difficult. If the domain is too small, there may not be enough users to provide predictions for each other. If the domain is too large, the predictions may be inaccurate. Given a test dataset for an application, ROCs can be used to test which partitioning into domains will be best. A set of predictions can be created for each partitioning under consideration, and an ROC created for the partitioning. The ROC that is best for the application indicates the optimal partitioning. Using ROCs for evaluation enables systems builders to select the design that is appropriate for their applications based on scientific principles.

SUMMARY OF METHOD STEPS

Figure 10:
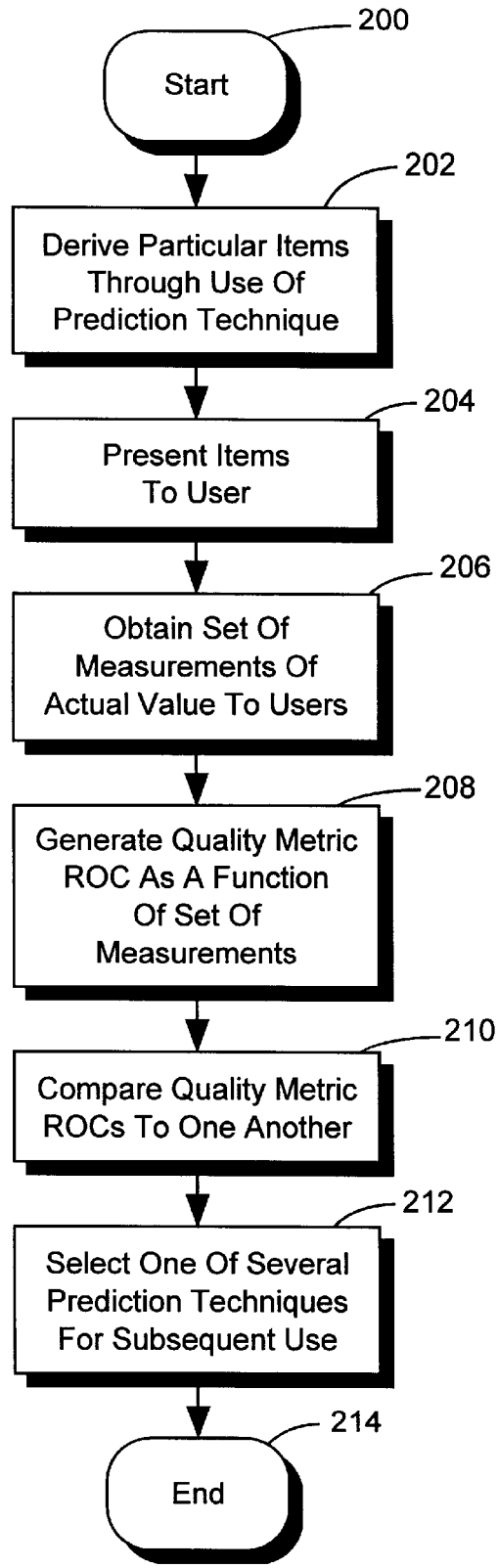
FIG. 10 is a flowchart of steps performed by a preferred embodiment information system.

The present invention can be summarized in reference to FIG. 10 which is a flowchart of steps 200–214 performed by the quality metric device 156 on a computer system 140 in order to determine predictive utility of prediction techniques in ascertaining which items are valued.

First, particular items are derived 202 from a plurality of items by utilizing predictions from a prediction technique. Second, the particular items are presented 204 to a user on a user interface device. Third, a set of measurements of actual value of the particular items presented to a user is obtained 206 through an input device. Subsequently, a quality metric receiver operating curve (ROC) is generated 208 from the set of measurements which corresponds to a measure of effectiveness of the prediction technique in predicting which items are valued by the user.

In an alternative embodiment two or more prediction techniques are evaluated together by the quality metric device 156. In this alternative embodiment the a first and a second set of particular items are derived 202 from a group of items by utilizing predictions from different prediction techniques. The first and the second set of particular items are presented 204 to the user. A first set of measurements of actual value of the first set of items presented to the user is obtained 206. In addition, a second set of measurements of actual value of the second set of items presented to the user is obtained 206. Subsequently, a first and a second quality metric ROC is generated 208 from the first and the second set of measurements, respectively.

Because two different ROCs have been generated, additional processes may be performed. For example, the first and the second quality metric ROC may be compared 210 to compare effectiveness of each different prediction technique to each other in predicting items valued by the user. The comparison can be used to select 212 one of the different prediction techniques for subsequent use. The different prediction techniques utilize different underlying prediction algorithm such that the selecting step comprises selecting which underlying prediction algorithm is subsequently used.

As mentioned above, the different prediction techniques may differ in many ways. For example, the prediction techniques may each utilize a different underlying prediction algorithm. This comparison of the first and the second quality metric ROC can be used to select which underlying prediction algorithm to use in the future. Alternatively, the different prediction techniques may utilize a single underlying prediction algorithm with different operating parameters such that the comparison of the first and the second quality metric ROC selects which operating parameters are subsequently used with the prediction algorithm. These operating parameters consist of partitioning schemes for the plurality of items by type of items, categories within the same type of item, or other ways in which a set of items may be subdivided.

In one embodiment of the present invention, a set of implicit measures are generated 206 from user input through the input device as the set of measurements of actual value of items presented to the user. A more detailed discussion of the use of implicit measures can be found in U.S. patent application Ser. No. 08/725,580, filed Oct. 7, 1996 entitled "SYSTEM, METHOD, AND ARTICLE OF MANUFACTURE FOR UTILIZING IMPLICIT RATINGS IN PREDICTION INFORMATION SYSTEMS" by Miller et al., now pending and U.S. patent application Ser. No. 08/729, 787, filed Oct. 8, 1996 entitled "SYSTEM, METHOD, AND ARTICLE OF MANUFACTURE FOR GENERATING IMPLICIT RATINGS BASED ON RECEIVER OPERATING CURVES" by Miller et al, now pending.

The implicit measure preferably is derived from one or more criteria. For example, these criteria may be user time spent viewing a particular item, user time spent listening to a particular item, and/or user time spent sampling a particular item. In addition, the implicit measure may be derived based on subsequent actions taken. These subsequent actions taken, for example, could be: a user viewing details of a particular item after viewing only a title, saving a particular item, forwarding a particular item, saving a return address of a particular item, deleting a particular item, replying to a particular item, and/or printing a particular item.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, as previously noted the user interface device may be a visual display; however, a printer, an audio device, a olfactory device, a tactile device, or any combination of these user interface devices may be used to convey information to the user without departing from the scope and spirit of the present invention as claimed. Similarly, the input device may be a keyboard, a mouse, a trackball, a touch pad, a light pen, a joy stick, a touch screen, or any other mechanism which is capable of obtaining data input by the user without departing from the scope and spirit of the present invention as claimed.

What is claimed is:

1. An electronic information system for determining predictive utility of recommendation techniques in ascertaining which items are preferred by a user, comprising:
   (a) input means for obtaining a set of measurements of user preference of items recommended to a user, the items presented to the user being derived from a plurality of items by utilizing recommendations from an adaptive recommendation technique; and
   (b) processing means, operatively coupled to the input means, generating a quality metric receiver operating curve (ROC) from the set of measurements which corresponds to a measure of effectiveness of the adaptive recommendation technique in predicting which items are preferred by the user.

2. The information system of claim 1 wherein:
   (a) the input means comprises means for obtaining a first and a second set of measurements of actual preference of a first and a second set of items recommended to the user, respectively, each set of items presented to the user being derived from the plurality of items by utilizing recommendations from different adaptive recommendation techniques; and
   (b) the processing means comprises means for generating a first and a second quality metric ROC from the first and the second set of measurements, respectively, and comparing the first and the second quality metric ROC to compare effectiveness of each different adaptive recommendation technique to each other in recommending items preferred by the user.

3. The information system of claim 2 wherein the processing means comprises means for selecting one of the different adaptive recommendation techniques for subsequent use based on the comparison of the first and the second quality metric ROC.

4. The information system of claim 3 wherein the different adaptive recommendation techniques utilize different underlying recommendation algorithms such that the comparison of the first and the second quality metric ROC selects which underlying recommendation algorithm is subsequently used.

5. The information system of claim 3 wherein the different adaptive recommendation techniques utilize a single underlying recommendation algorithm with different operating parameters such that the comparison of the first and the second quality metric ROC selects which operating parameters are subsequently used with the recommendation algorithm.

6. The information system of claim 5 wherein the operating parameters comprise partitioning schemes for the plurality of items.

7. The information system of claim 1 wherein the input means comprises means for generating a set of implicit measures from user input as the set of measurements of actual user preference of items recommended to the user.

8. The information system of claim 7 wherein the input means comprises means for generating the set of implicit measures based on criteria selected from a group consisting of: user time spent viewing a particular item, user time spent listening to a particular item, and user time spent sampling a particular item.

9. The information system of claim 7 wherein the input means comprises means for generating the set of implicit measures based on subsequent actions taken, the subsequent actions taken being selected from a group consisting of: the user viewing details of a particular item after viewing only a title, saving a particular item, forwarding a particular item, saving a return address of a particular item, deleting a particular item, replying to a particular item, and printing a particular item.

10. The information system of claim 1 wherein the input means and processing means together form a quality metric device, the information system further comprising a client device operatively coupled to the quality metric device, the client device comprising:

(a) user interface means for recommending the items to the user;

(b) user input means for receiving data input by the user from which a set of measurements of actual user preference of items recommended to a user is obtained;

(c) client processing means, operatively coupled to the user interface means and user input means, for receiving items to recommend to the user from an output mechanism of the quality metric device, obtaining the set of measurements of actual user preference of items based on the data input by the user, and providing the set of measurements of actual user preference of items to the input means of the quality metric device.

11. The information system of claim 10 wherein the quality metric device and the client device are located within a single apparatus.

12. The information system of claim 10 wherein the quality metric device and the client device each comprise means for communicating with each other through an interactive network such that the quality metric device and the client device can be remotely located from one another in separate apparatuses.

13. A method of operating an electronic information system in order to determine predictive utility of recommendation techniques in ascertaining which items are preferred by a user, comprising:

(a) deriving particular items from a plurality of items by utilizing recommendations from an adaptive recommendation technique;

(b) presenting the particular items to a user on a user interface device;

(c) obtaining a set of measurements of actual value of the particular items presented to a user through an input device; and (d) generating a quality metric receiver operating curve (ROC) from the set of measurements which corresponds to a measure of effectiveness of the adaptive recommendation technique in predicting which items are preferred by the user.

14. The method of claim 13:

(a) wherein the deriving step comprises deriving a first and a second set of particular items from a plurality of items by utilizing recommendations from different adaptive recommendation techniques;

(b) wherein the presenting step comprises presenting the first and the second set of particular items to the user;

(c) wherein the obtaining step comprises obtaining a first and a second set of measurements of actual user preference of the first and the second set of items presented to the user, respectively;

(d) wherein the generating step comprises generating a first and a second quality metric ROC from the first and the second set of measurements, respectively; and (e) further comprises a step of comparing the first and the second quality metric ROC to compare effectiveness of each different adaptive recommendation technique to each other in predicting items preferred by the user.

15. The method of claim 14 further comprising a step of selecting one of the different adaptive recommendation techniques for subsequent use based on the comparing step.

16. The method of claim 15 wherein the different adaptive recommendation techniques utilize different underlying recommendation algorithms such that the selecting step comprises selecting which underlying recommendation algorithm is subsequently used.

17. The method of claim 15 wherein the different adaptive recommendation techniques utilize a single underlying recommendation algorithm with different operating parameters such that the selecting step comprises selecting which operating parameters are subsequently used with the recommendation algorithm.

18. The method of claim 17 wherein the operating parameters comprise partitioning schemes for the plurality of items.

19. The method of claim 18 wherein the obtaining step comprises generating a set of implicit measures from user input through the input device as the set of measurements of actual user preference of items presented to the user.

20. The method of claim 19 wherein the obtaining step comprises deriving the implicit measure based on criteria selected from a group consisting of: user time spent viewing a particular item, user time spent listening to a particular item, and user time spent sampling a particular item.

21. The method of claim 19 wherein the obtaining step comprises deriving the implicit measure based on subsequent actions taken, the subsequent actions taken being selected from a group consisting of: a user viewing details of a particular item after viewing only a title, saving a particular item, forwarding a particular item, saving a return address of a particular item, deleting a particular item, replying to a particular item, and printing a particular item.

22. A program storage device readable by a computer system tangibly embodying a program of instructions executable by the computer system to perform a method of operating an electronic information system in order to determine predictive utility of recommendation techniques in ascertaining which items are preferred by a user, the method comprising steps of:

(a) deriving particular items from a plurality of items by utilizing recommendations from an adaptive recommendation technique;

(b) presenting the particular items to a user on a user interface device;

(c) obtaining a set of measurements of actual user preference of the particular items presented to a user through an input device; and (d) generating a quality metric receiver operating curve (ROC) from the set of measurements which corresponds to a measure of effectiveness of the adaptive recommendation technique in predicting which items are preferred by the user.

23. The program storage device of claim 22 wherein:

(a) the method deriving step comprises deriving a first and a second set of particular items from a plurality of items by utilizing recommendations from different adaptive recommendation techniques;

(b) the method presenting step comprises presenting the first and the second set of particular items to the user;

(c) the method obtaining step comprises obtaining a first and a second set of measurements of actual user preference of the first and the second set of items presented to the user, respectively;

(d) the method generating step comprises generating a first and a second quality metric ROC from the first and the second set of measurements, respectively; and (e) the method further comprises a step of comparing the first and the second quality metric ROC to compare effectiveness of each different recommendation technique to each other in predicting items preferred by the user.

24. The program storage device of claim 23 wherein the method further comprises a step of selecting one of the different recommendation techniques for subsequent use based on the comparing step.

* * * * *